March 13, 1945.  H. T. FAUS  2,371,511

MAGNETIC TRANSMISSION

Filed Feb. 23, 1943  2 Sheets—Sheet 1

Inventor:
Harold T. Faus,
by Harry E. Dunham
His Attorney.

March 13, 1945. H. T. FAUS 2,371,511
MAGNETIC TRANSMISSION
Filed Feb. 23, 1943 2 Sheets-Sheet 2
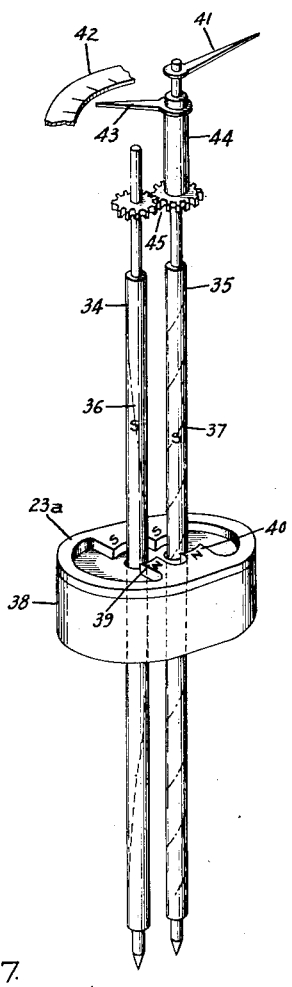
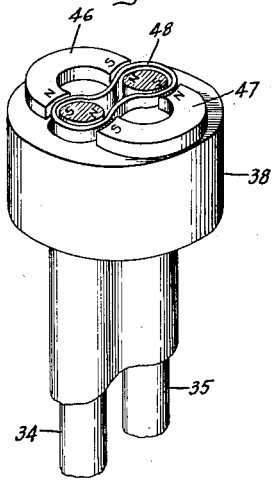
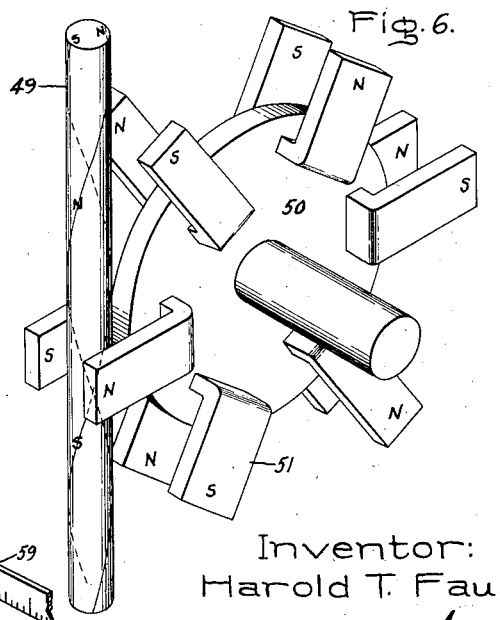
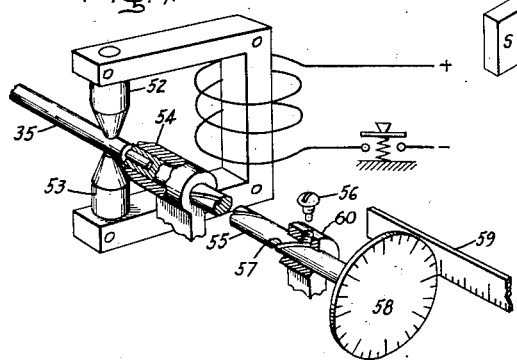
Inventor:
Harold T. Faus,
by Harry E. Dunham
His Attorney.

Patented Mar. 13, 1945

2,371,511

UNITED STATES PATENT OFFICE 2,371,511

MAGNETIC TRANSMISSION

Harold T. Faus, Lynn, Mass., assignor to General Electric Company, a corporation of New York Application February 23, 1943, Serial No. 476,869

8 Claims. (Cl. 172—284)

My invention relates to spiral magnetic gearing and its practicable application to useful purposes.

Figure 2:
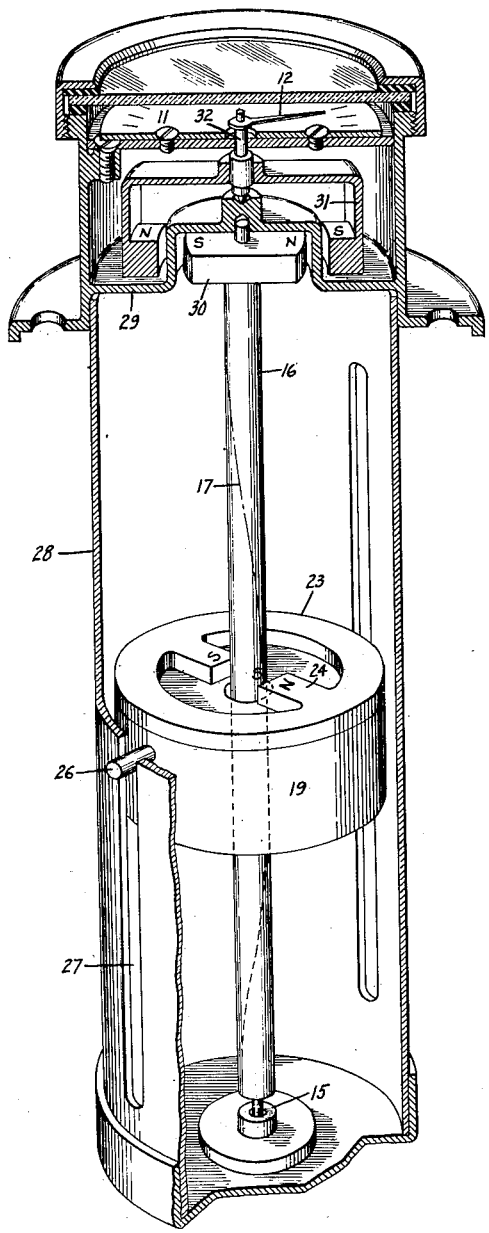
Figure 3:
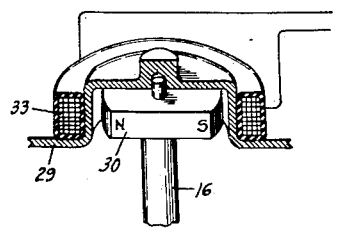

I have discovered that cylindrical rods of suitable permanent magnetic material may be polarized across a diameter, and the axis of polarization changed spirally of the rod over its length analogous to the cutting of a spiral thread along a shaft, and that the spirally polarized rod may then cooperate with a second magnet acting as a nut with respect to the spirally polarized rod for the purpose of transmitting small rotational forces to the rod as the magnetic nut and rod move relative to each other axially of the rod. As a practicable use for such magnetic gearing I have shown in Fig. 1, a tank gauge where the magnet nut is mounted on a float and embraces the spirally magnetized shaft to rotate the latter and operate a pointer with respect to a dial for the purpose of indicating the amount of liquid in the tank. Fig. 2 represents another modification of the same character with a gas-tight magnetic transmission between shaft and pointer. Fig. 3 shows how a transmitter instead of a pointer may be operated by the float gauge of Fig. 2. Fig. 4 represents a double magnetic rod and nut transmission having different gear ratios used as a tank gauge, Fig. 5 represents a modified double magnet gear transmission, Fig. 6 represents a form of magnetic worm gear embodying the spirally polarized rod of my invention, and Fig. 7 illustrates apparatus for the spiral magnetization of rods. The features of my invention which are believed to be novel and patentable will be pointed out in the claims appended hereto.

Figure 1:
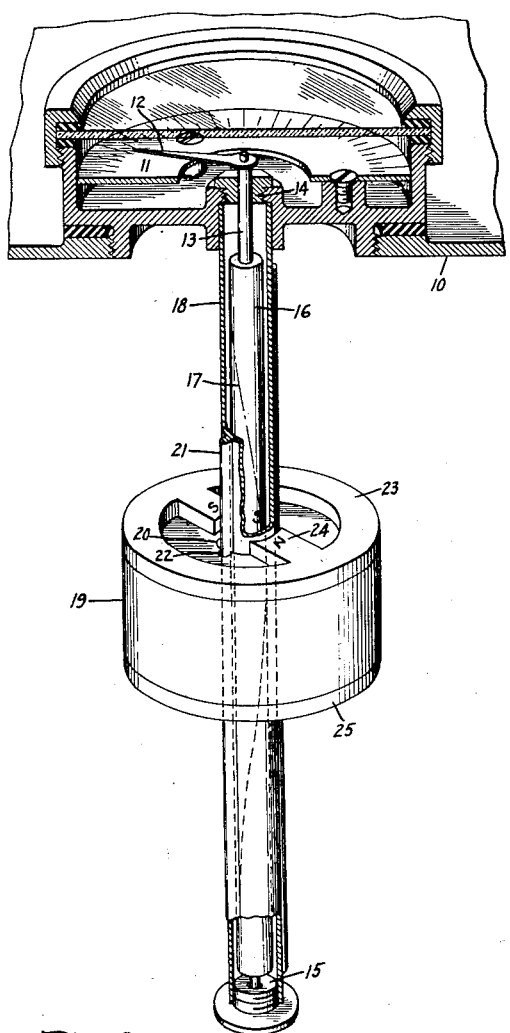

Referring now to Fig. 1, 10 represents the upper wall of a gasoline or other liquid-containing tank. Sealed into this upper wall is the indicating part of a gauge having a graduated dial 11 and rotatable pointer 12 cooperating with the scale of dial 11. The pointer is on the upper end of a vertical shaft 13 rotatively mounted in bearings 14 and 15, the latter being at or near the bottom wall of the tank which may have any desired practicable depth. The tank portion 16 of the shaft is shown to be of larger diameter than the pivot portions and is made of a smooth, high coercive force permanent magnet material. The reduced pivot portions of the shaft may be made of the same material or of any other suitable material. The part 16 of the shaft is polarized across its diameter, and the axis of polarization is spiraled along the shaft. For example, the dash line 17 thereon may indicate the center of a spiral line of negative polarity on the surface. A spiral line of positive polarity will occur diametrically opposite the line 17. Where the tank is of uniform lateral dimensions throughout its depth, the spiral polarization pitch of shaft 16 will be uniform. If the tank should vary in its lateral dimensions, and volume over its depth, as in a cylindrical tank with its axis horizontal, the magnetic spiraling polarization pitch of rod 16 could be made so as to vary accordingly.

Closely surrounding but without touching the rod 17 is a tubular member 18 made of nonmagnetic material such as brass. Member 18 serves as a guide for a float 19 and is preferably also liquid-tight to prevent the tank liquid from entering tubular member 18. The float 19 has a central opening 20 loosely embracing the tubular member 17, and the member 17 has one or more guide beads 21 which engage corresponding recesses 22 in the opening 20 of the float to prevent the float from turning on the guide tube 18. Thus the float is free to move up and down along the guide tube 18 but may not turn thereon.

Mounted on the float is a circular permanent magnet 23 having inwardly extending diametrically opposite pole pieces 24 which approach close to and terminate in pole faces of opposite polarity on opposite sides of the magnetized shaft rod 16 with the nonmagnetic tube 18 intervening. As thus arranged, the magnet 23 may be considered the stationary element and the rod 16 the rotor element of a magnetic instrument which cooperate to rotate rod 16 until its polarized axis is in line with the pole pieces 24 of the magnet, as indicated, with unlike poles attracting each other. Thus the south pole 17 of rod 16 is opposite the north pole of magnet 23. Now as the float 19 moves up and down with corresponding variations in liquid level in the tank, the rod 16 is turned to maintain its spiraled axis of polarization in line with the pole pieces of magnet 23. To increase the torque the float may have magnets 24 and 25 at top and bottom, in which case the pole pieces of the two magnets will be turned relative to each other in a direction and by an amount corresponding to the direction and amount of spiraling of the polarization of rod 16 between the top and bottom of the float.

I have found that for a simple indicator, such as shown, only one lightweight magnet 23 is required on the float and where only one magnet is used, the pitch of the spiral polarization of the rod 16 may vary along the rod where that is desired. The sealing of the tank liquid from the bearings 14, 15 by the tube 18 is desirable in gasoline tanks because the lead in gasoline has a tendency to gum bearing surfaces.

It is now apparent that I have provided a liquid level gauge in which the drive between the float 19 and the pointer 12 comprises a spiral magnetic frictionless gear, and that the bearings of shaft 13—16 are sealed from the tank liquid. The scale 11 will of course be calibrated with the spiral gear and float to read gallons, inches of liquid, or whatever units are desirable.

Fig. 2 represents another modification of the invention suitable for many applications. Here the spirally polarized shaft 16 is not sealed from the liquid. The guide for preventing the float 19 from turning comprises pins 26 on opposite sides of the float which slide in slots 27 of a guide member 28 as the float rises and falls. There is provided a liquid- and gas-tight seal between the shaft 16 and pointer 12 comprising a nonmagnetic seal cap 29 and through which a magnetic drive operates. As shown in Fig. 2, such drive comprises a bar permanent magnet 30 on the upper end of shaft 16 and a U-shaped permanent magnet 31 secured to pointer stub shaft 32. The bar and U-shaped magnets could be reversed. In case the indication is desired at a remote point, a telemeter transmitter could replace the pointer 12 and its drive magnet 31, and in Fig. 3, I have shown the bar magnet 30 as comprising the rotor element of a telemetering transmitter having a stator winding 33. In this arrangement the cap member 29 acts not only as a seal but as a supporting spool for the stator winding.

In Fig. 4, I have shown a double magnetic gear arrangement embodying my invention, the two gears being of different ratio, and the application thereof for driving the unit and tens pointers of a liquid level gauge. Here 34 and 35 represent two parallel shafts of permanent magnet material, shaft 34 being diametrically polarized, as indicated, by spiral line 36 at one pitch and shaft 35 being diametrically polarized, as indicated, by spiral line 37 at, for example, ten times the pitch of shaft 34. In each case the spiral lines 36 and 37 represent the spiral pole of negative polarity; 38 represents a float or other device which is moved axially of the shafts 34 and 35. It is provided with openings near its center through which the shafts 34 and 35 loosely pass, and with a permanent magnet 23a with its inwardly facing pole pieces each divided into two pole tips 39 and 40. The positioning of these pole tips is such that shaft 34 lies between one set of north and south poles, and shaft 35 lies between the other set of north and south poles. Hence, the shafts are caused to rotate until their axes of magnetic polarization are in line with their respective stator pole pieces, with the magnetic poles of the shafts facing poles of opposite magnetic polarity of the stator. The magnetic spiraling of the two shafts is in opposite directions so that as the float rises, one shaft 35 will rotate clockwise and the other shaft 34 will rotate counterclockwise at one-tenth the rate of shaft 34. A pointer 41 is carried at the upper end of shaft 35 and cooperates with a scale 42. A pointer 43 also cooperating with scale 42 is carried on a sleeve 44 rotatable on the reduced upper end portion of shaft 35, and the sleeve is geared to shaft 34 by one-to-one gears at 45. The two pointers thus turn in the same direction when float 38 rises, and one may serve to indicate gallons and the other tenths of gallons on the scale.

Fig. 5 represents a modified arrangement of the double magnetic gear of Fig. 4. In Fig. 5 the float 38 is provided with two U-shaped permanent magnets 46 and 47 with the pole faces of opposite magnetic polarity facing each other, with the spirally polarized shafts 34 and 35 interposed, as represented. A nonmagnetic tubular member 48 is interposed between the float 38 and the shafts 34 and 35 and serves to seal the liquid from the shafts, and also serves as a guide to prevent the float from turning. Sufficient clearance is provided between the parts to allow free turning of the shafts and free axial movement of the float or magnetic nut member 38.

In Fig. 6, I have represented a further modification of my invention where a spirally magnetized shaft 49 is rotated by a magnetic gear wheel 50. The wheel carries an even number of horseshoe-shaped permanent magnets 51 with their open legs extending radially beyond the periphery of the wheel opposite each other, and the shaft 48 positioned tangent to the wheel 50. The legs of the magnets embrace the polarized shaft 49 without touching the same as the wheel is rotated. Alternate magnets about the periphery of the wheel have their polarities reversed, as shown. The rotary position of the shaft 49 is determined by the polarity of the magnet which most completely embraces it. As shown, the near north pole of the embracing magnet attracts the south pole of the shaft, and the far south pole of the magnet attracts the north pole of the shaft. Assume the wheel 50 is now turned clockwise, shaft 49 will turn clockwise as viewed from its upper end, since the influence of the embracing magnet continues over several degrees of arc rotating the shaft 49 to keep the polarized axes in line with the flux crossing the gap between the poles of the magnet. Before one magnet loses its influence on the shaft, another reversely polarized magnet has been turned to partially embrace the shaft at a point on the shaft about 180 degrees spiral pitch away, and thus the shaft 49 is driven as the wheel turns by what may be termed a magnetic worm gear. The nearer the effective spacing between the magnets on the wheel corresponds to the distance between north and south poles on the shaft measured lengthwise of the shaft, the smoother and more powerful will be the drive. The spiraled polarization of the shaft 49 does not need to extend along the shaft beyond about one full turn, and, in some cases, it may be found advantageous for smooth operation to change slightly the pitch of the spiral polarization or modify its strength at the extremities of the polarized section. For small torques the drive may be either direction, that is, shaft 49 may be either the driven or driving member.

One permanent magnet material which I have found to be satisfactory for the spiral magnetic gear rod, such as the rod 16 in Fig. 1, is an alloy containing about 4.7 per cent aluminum, 8.8 per cent manganese, and 86.5 per cent silver, made in accordance with the teachings of my United States Patent 2,247,804, July 1, 1941.

The preferred diameter of such rods for float gauges will vary in proportion to the required rod length, and it appears that the range of preferred diameters for such rods will vary between one-eighth and one-quarter inch.

The spiral magnetization of the gear rod may be accomplished by drawing the rod endwise between the poles of a powerful direct current electromagnet while at the same time turning the rod on its axis. Fig. 7 illustrates one way of doing this. Here 52 and 53 are the conical shaped pole pieces of opposite magnetic polarity of a powerful direct current electromagnet. The rod 35 to be magnetized is supported for axial and rotary movement through the air gap of the electromagnet. 54 represents a stationary shield of good permeability magnetic material having an opening therethrough, through which the rod 16 is drawn after being magnetized so as to prevent demagnetization by fringing leakage flux from the electromagnet near its pole pieces. The central opening of shield 54 in alignment with the rod 16 is of such diameter as to allow sliding fit with a nonmagnetic holder rod 55, to which rod 16 is secured and by means of which the rod 16 may be turned on its axis and moved endwise. To facilitate uniformity in the polarization of rod 35 a guide 60 may serve as a stationary nut and the rod 35 may be threaded therethrough at a pitch corresponding to the magnetic spiral pitch desired. For example, the tip of a set screw 56 in guide 60 may enter a spiral groove 57 in rod 55 for this purpose. Now with the electromagnet energized, rod 55 is simply screwed through guide 60 to the right, drawing and turning rod 35 with it between the pole pieces 52 and 53, causing the spiral magnetization of the latter. Holder rods 55 having various different pitches may be provided and substituted.

Another procedure useful for obtaining spiral magnetizations of odd or varying pitches is also illustrated. The rod 55 may have secured to it a uniformly graduated dial 58 cooperating with a stationary scale 59. With screw 56 backed out of groove 57, the dial 58 and scale 59 may be used to determine the nature of the spiral polarization of rod 35. Using this expedient the rod 35 is turned and moved endwise by hand by small amounts determined by the graduations, and while being adjusted from one graduation to the the next in the two directions, the electromagnet may be deenergized and energized momentarily after each such small adjustment. As a result the rod 35 is polarized at closely spaced points across its diameter and spirally along the rod, the points being sufficiently close together to have the areas of polarization meet or overlap and producing the effect of a continuous smooth magnetic spiral. The pitch variations obtainable are unlimited, since the operator can make any choice desirable. He may, for example, spiral first in one direction and then in the other to produce a magnetic cam effect. The spiral polarization may be made continuous or interrupted, etc., and where in the claims I refer to the polarization of a rod transversely to and spirally along its axis, I mean to include such modifications and, moreover, I do not limit my invention to polarized rods which are necessarily circular in cross section.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a magnetic drive a magnetic gear member thereof comprising a rotatably mounted smooth cylindrical shaft of permanent magnetic material polarized transversely to and spirally along its axis of rotation.

2. A magnetic transmission comprising a smooth cylindrical rod of permanent magnetic material polarized transversely to and spirally along its axis, and a magnetic nut member loosely embracing said rod and having inwardly projecting magnetic pole pieces in alignment with the polarized axis of said rod.

3. A magnetic transmission comprising a rotatively mounted smooth cylindrical rod of permanent magnetic material polarized transversely to and spirally along its axis, a relatively movable cooperating member having permanent magnet means forming pole pieces of opposite magnetic polarity embracing said rod in alignment with the polarized axis of the latter, said cooperating member being constrained to move so that its magnetic pole pieces have a movement axially of but not about said rod, such movement causing the rod to turn on its axis to keep its polarized axis in alignment between the pole pieces of said cooperating member by magnetic attraction.

4. A magnetic transmission comprising a rotatively mounted smooth cylindrical rod of permanent magnetic material polarized transversely to and spirally along its axis, a cooperating member movable along but not about said rod and having a permanent magnet with inwardly projecting pole pieces approaching closely to said rod from diametrically opposite sides thereof, said member causing the rotation of said rod when moved axially thereof by reason of magnetic attraction between their adjacent magnetic poles of opposite polarity.

5. A multiple magnetic transmission comprising a pair of parallel rotatively mounted smooth cylindrical rods of permanent magnetic material each polarized transversely to and spirally along its axis, the pitch of the spiral polarization in the two rods being different, a cooperating member movable along but not about said rods, said member having permanent magnet means forming a pair of inwardly projecting pole pieces of opposite magnetic polarity one pair approaching closely adjacent to one rod on opposite diameters thereof and the other pair approaching closely adjacent the other rod on opposite diameters thereof, said member causing the rotation of said rods at rates corresponding to the difference in the pitches of their spiral polarization when said member is moved axially of said rods.

6. A magnetic transmission comprising a rotatively mounted smooth cylindrical rod of permanent magnetic material polarized transversely to and spirally along its axis, a member mounted for rotation about an axis perpendicular to the axis of rotation of said rod, said member carrying magnetic means forming an even number of pairs of permanent magnet pole pieces of opposite magnetic polarity uniformly distributed about the axis of rotation of said member such that when said member is rotated in a given direction each such pair of pole pieces will embrace said spirally polarized rod in succession causing magnetic alignment of the polarized axis of the rod with said pole pieces by reason of magnetic attraction, one pair of said pole pieces becoming effective before the preceding pair of pole pieces becomes noneffective for this purpose, and the adjacent pairs of pole pieces being spaced approximately one-half spiral pitch of the polarized rod apart when so effective and having the polarity of their poles which approach the same side of the rod reversed.

7. A magnetic transmission comprising a rotatively mounted smooth cylindrical rod of permanent magnetic material polarized transversely to and spirally along its axis, a wheel rotatively mounted on an axis perpendicular to the axis of rotation of said rod with the rod extending tangentially to but out of contact with the periphery of the wheel, an even number of U-shaped permanent magnets uniformly distributed about the wheel with their open legs extending radially beyond the periphery of the wheel so as to loosely embrace said rod between their pole pieces in succession as the wheel is rotated in a given direction, said permanent magnets being spaced to correspond to approximately one-half of the polarized spiral pitch of the rod and adjacent such magnets being reversely polarized and one magnet becoming effective to influence the rotative position of the rod by reason of magnetic attraction before the preceding magnet becomes noneffective for that purpose.

8. A magnetic transmission comprising a rotatively mounted smooth cylindrical rod of permanent magnet material polarized transversely to and spirally along its axis, a cooperating member movable along but not about said rod and having permanent magnet means with inwardly projecting pole pieces of opposite magnetic polarity approaching closely to said rod from diametrically opposite sides thereof, said member causing the rotation of said rod when moved axially thereof by reason of magnetic attraction between the adjacent magnetic poles of opposite polarity, means rotated by said rod for indicating the axial position of said member relative to said rod and a liquid-tight seal between said rod and axially movable member.

HAROLD T. FAUS.